US012564961B2

(12) United States Patent
Mishima

(10) Patent No.: US 12,564,961 B2
(45) Date of Patent: Mar. 3, 2026

(54) INFORMATION PROCESSING DEVICE, INFORMATION PROCESSING METHOD, AND PROGRAM

(71) Applicant: OMRON Corporation, Kyoto (JP)

(72) Inventor: Kazuma Mishima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 162 days.

(21) Appl. No.: 18/547,456

(22) PCT Filed: Dec. 20, 2021

(86) PCT No.: PCT/JP2021/047120

§ 371 (c)(1),
(2) Date: Aug. 22, 2023

(87) PCT Pub. No.: WO2022/190538

PCT Pub. Date: Sep. 15, 2022

(65) Prior Publication Data

US 2024/0123622 A1 Apr. 18, 2024

(30) Foreign Application Priority Data

Mar. 12, 2021 (JP) ................................. 2021-040582

(51) Int. Cl.
*B25J 9/16* (2006.01)
*B25J 19/02* (2006.01)

(52) U.S. Cl.
CPC ........... *B25J 9/1676* (2013.01); *B25J 9/1666* (2013.01); *B25J 9/1697* (2013.01); *B25J 19/021* (2013.01)

(58) Field of Classification Search
CPC ...... B25J 9/1676; B25J 9/1666; B25J 9/1697; B25J 9/1674; B25J 19/021; B25J 19/06;
(Continued)

(56) References Cited

U.S. PATENT DOCUMENTS

2016/0207198 A1 7/2016 Willför et al.
2016/0290799 A1* 10/2016 Gupta ...................... G01C 9/00
(Continued)

FOREIGN PATENT DOCUMENTS

JP H02276901 A 11/1990
JP 2008213056 A 9/2008
(Continued)

OTHER PUBLICATIONS

Extended European search report issued in European Appln. No. 21930383.1, mailed on Nov. 28, 2024.
(Continued)

*Primary Examiner* — Nhi Q Bui
(74) *Attorney, Agent, or Firm* — ROSSI, KIMMS & McDOWELL LLP

(57) ABSTRACT

An information processing apparatus includes: an acquirer configured to acquire distance information measured and output in a state where a sensor is installed so that at least a part of a robot enters a measurable area of the sensor; a recognizer configured to recognize a 3-dimensional operation range of the robot from the distance information measured by the sensor at a plurality of timings while moving the robot; a determiner configured to determine whether there is a change in the 3-dimensional operation range of the robot based on the distance information measured by the sensor during an actual motion of the robot; and a warner configured to give a warning indicating occurrence of a deviation of the sensor when the determiner determines that there is a change in the 3-dimensional operation range of the robot.

10 Claims, 4 Drawing Sheets

(58) Field of Classification Search
CPC .......... G05B 2219/14039; G05B 2219/40457;
G05B 2219/40202; G05B 2219/40203;
F16P 3/14; F16P 3/144; F16P 3/147
See application file for complete search history.

(56) References Cited

U.S. PATENT DOCUMENTS

| | | | |
|---|---|---|---|
| 2019/0099902 A1 | 4/2019 | Yamamoto et al. | |
| 2020/0331146 A1* | 10/2020 | Vu | G06T 19/20 |
| 2021/0053224 A1* | 2/2021 | Schroeder | B25J 9/1651 |
| 2021/0245366 A1 | 8/2021 | Tanaka et al. | |

FOREIGN PATENT DOCUMENTS

| | | | |
|---|---|---|---|
| JP | 2019098431 A | 6/2019 |
| JP | 2020511325 A | 4/2020 |
| WO | 2018148181 A1 | 8/2018 |
| WO | 2019240051 A1 | 12/2019 |

OTHER PUBLICATIONS

International Search Report issued in Intl. Appln. No. PCT/JP2021/047120 mailed Mar. 8, 2022. English translation provided.
Written Opinion issued in Intl. Appln. No. PCT/JP2021/047120 mailed Mar. 8, 2022. English translation provided.

* cited by examiner

INFORMATION PROCESSING DEVICE, INFORMATION PROCESSING METHOD, AND PROGRAM

TECHNICAL FIELD

The present invention relates to an information processing apparatus, an information processing method, and a program.

BACKGROUND ART

Sensors are used to detect objects such as human bodies in scenes such as production sites where monitoring is required.

For example, systems that monitor predetermined areas around robots using 3D sensors and perform safety control such as deceleration or stopping of the robots when operators or the like approach the robots are known. In the systems, predetermined areas to be monitored are set based on operation ranges of the robots learned using images captured by the 3D sensors (see, for example, Patent Document 1).

PRIOR ART DOCUMENTS

Patent Documents

Patent Document 1: JP 2020-511325 A

SUMMARY OF THE INVENTION

Problems to be Solved by the Invention

However, in Patent Document 1, when deviations such as installation position deviations or optical axis deviations occur in sensors, objects cannot be reliably detected in predetermined areas to be monitored. On the other hand, it is not easy for users to recognize the deviations of the sensors.

Accordingly, an object of the present invention is to provide a technology that enables a user to easily recognize a deviation of a sensor.

Means for Solving the Problem

In order to achieve the above object, the present invention adopts the following configurations.

A first aspect of the present invention provides an information processing apparatus including: an acquirer configured to acquire distance information measured and output in a state where a sensor is installed so that at least a part of a robot enters a measurable area of the sensor; a recognizer configured to recognize a 3-dimensional operation range of the robot from the distance information measured by the sensor at a plurality of timings while moving the robot; a determiner configured to determine whether there is a change in the 3-dimensional operation range of the robot based on the distance information measured by the sensor during an actual motion of the robot; and a warner configured to give a warning indicating occurrence of a deviation of the sensor when the determiner determines that there is a change in the 3-dimensional operation range of the robot.

The "sensor" is, for example, a time of flight (TOF) sensor.

In this configuration, it is determined whether there is a change in the 3-dimensional operation range of the robot based on the distance information measured by the sensor during the actual motion of the robot. When there is a change in the 3-dimensional operation range of the robot, a warning indicating occurrence of a deviation of the sensor is given. As a result, the user can easily recognize the deviation of the sensor.

Further, the recognizer may convert each piece of distance information measured by the sensor at the plurality of timings into object range information indicating a range occupied by each object in the measurable area, may generate actual motion information indicating a range occupied by the robot in the measurable area, excluding surrounding environment information indicating a range occupied by an object other than the robot in the measurable area from the object range information, and may calculate a 3-dimensional operation range of the robot by superimposing the actual motion information at the plurality of timings. Accordingly, the 3-dimensional operation range of the robot, and further a dangerous area determined based on the 3-dimensional operation range, can be determined in a short time.

The information processing apparatus may further include a setter configured to set the surrounding environment information based on the distance information measured by the sensor in a state where the robot is stopped. Accordingly, it is possible to simply set the surrounding environment information.

Further, the distance information measured by the sensor at the plurality of timings may be distance information measured by the sensor while moving the robot in the same operation as during the actual motion. Accordingly, it is possible to accurately determine a change in the operation range of the robot during an actual motion, and further, a deviation of the sensor. When a dangerous area or a protection area is set based on the operation range of the robot, it is possible to set a minimum and optimum dangerous area and protection area.

Whenever work content of the robot is changed, the recognizer may recognize an operation range of the robot in accordance with the changed work content. Accordingly, even when the operation range of the robot changes in accordance with the change of the work content by the robot, the deviation of the sensor can be accurately determined. When the dangerous area and the protection area are set based on the operation range of the robot, it is possible to set a minimum and optimum dangerous area and protection area in accordance with the work content of the robot.

The information processing apparatus may further include: a determiner configured to determine a dangerous area based on the 3-dimensional operation range of the robot; and a monitor configured to monitor an intruder approaching the dangerous area based on the distance information measured by the sensor during the actual motion of the robot. By determining the dangerous area based on the operation range of the robot recognized from the measurement result of the sensor, the dangerous area having an appropriate position and size can be automatically determined, and an intruder can be appropriately monitored.

The determiner may determine the size of the dangerous area in consideration of a 3-dimensional operation range and a margin of the robot and the margin may be user-changeable. Accordingly, the size of the dangerous area can be easily changed.

The information processing apparatus may further include: a protection area setter configured to set, outside of the dangerous area, a protection area which is a 3-dimensional area where a safety distance is taken into consideration. The monitor may monitor an intruder approaching the dangerous area in the protection area. Accordingly, the robot can reliably complete deceleration and stopping before an intruder approaching the dangerous area reaches the dangerous area.

The protection area setter may set the protection area in consideration of surrounding environment information indicating a range occupied by an object other than the robot in the measurable area. Accordingly, a minimum necessary protection area can be set.

The monitor may further detect an object moving from the dangerous area to the protection area based on the distance information measured by the sensor during the actual motion of the robot. The information processing apparatus may further include a danger warner configured to give a danger warning when the monitor detects an object moving from the dangerous area to the protection area. Since it is unlikely that an object will move from the dangerous area to the protection area in a general situation, the detection of an object moving from the dangerous area to the protection area assumes a deviation or failure of the sensor or an erroneous motion of the robot, and there is danger in either case.

When there is an area located outside of the measurable area in the protection area, a warning may be given. This is because an area located outside of the measurable area cannot be used as a protection area in that the sensor cannot measure the distance information.

A second aspect of the present invention provides an information processing method including: a step of acquiring distance information measured and output in a state where a sensor is installed so that at least a part of a robot enters a measurable area of the sensor; a step of recognizing a 3-dimensional operation range of the robot from the distance information measured by the sensor at a plurality of timings while moving the robot; a step of determining whether there is a change in the 3-dimensional operation range of the robot based on the distance information measured by the sensor during an actual motion of the robot; and a step of giving a warning indicating occurrence of a deviation of the sensor when it is determined that there is a change in the 3-dimensional operation range of the robot.

A third aspect of the present invention provides a program causing a computer to execute each step of the information processing method.

The present invention may be understood as an information processing apparatus, a sensor deviation determination apparatus, or the like having at least some of the foregoing units, or may be ascertained as an object detection system, a monitoring system, or the like including such a apparatus and the sensor. The present invention may be ascertained as an information processing method including at least some of the foregoing processing, a sensor deviation determination method, an object detection method, a monitoring method, or a control method. The present invention can also be ascertained as a program implementing such a method or a recording medium in which such a program is permanently recorded. The present invention can be configured by combining the foregoing units and processing as far as possible.

Effect of the Invention

According to the present invention, a user can easily recognize a deviation of a sensor.

MODE FOR CARRYING OUT THE INVENTION

Application Example

Figure 1:
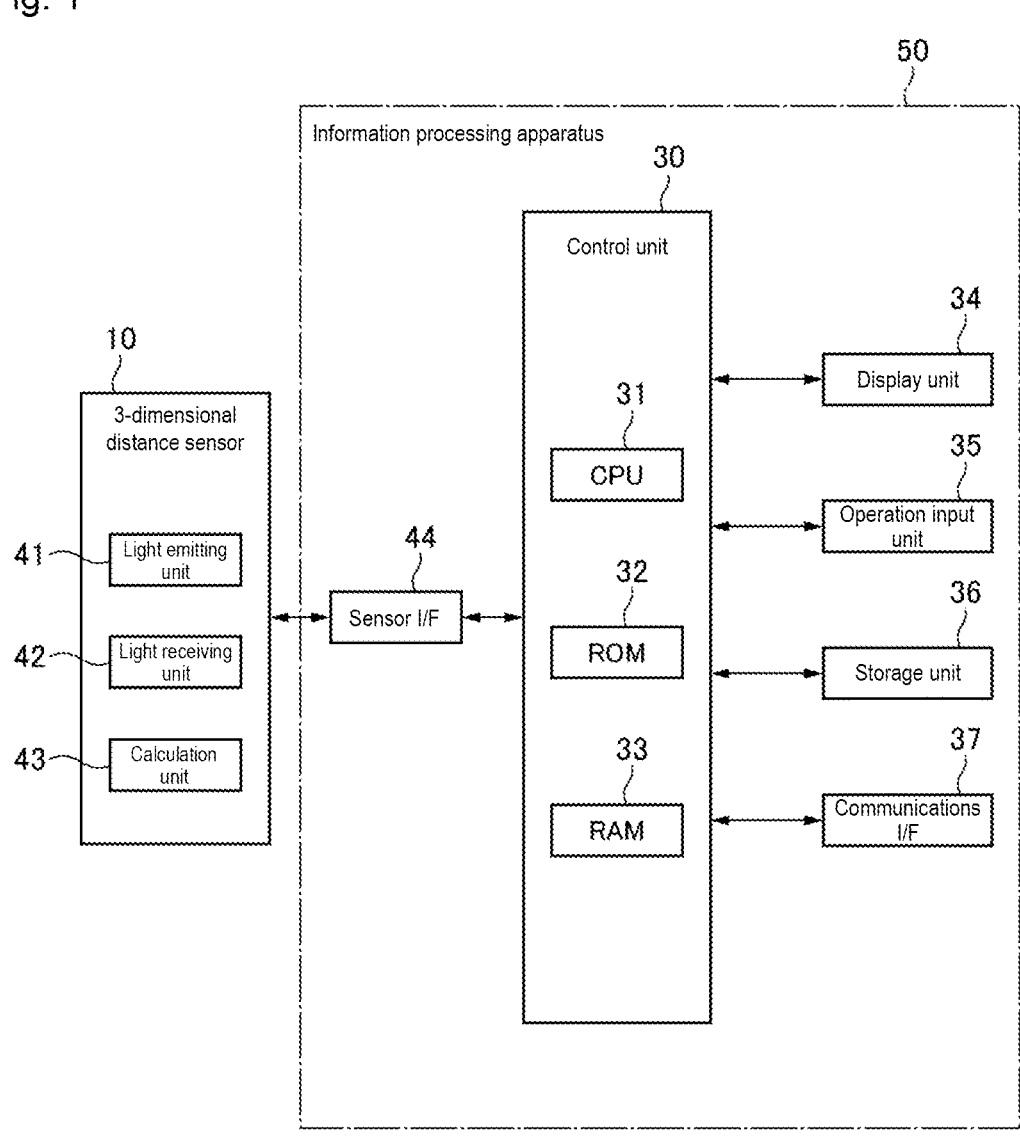
FIG. 1 is a block diagram illustrating a monitoring system including an information processing apparatus and a sensor according to an embodiment of the present invention.
Figure 2:
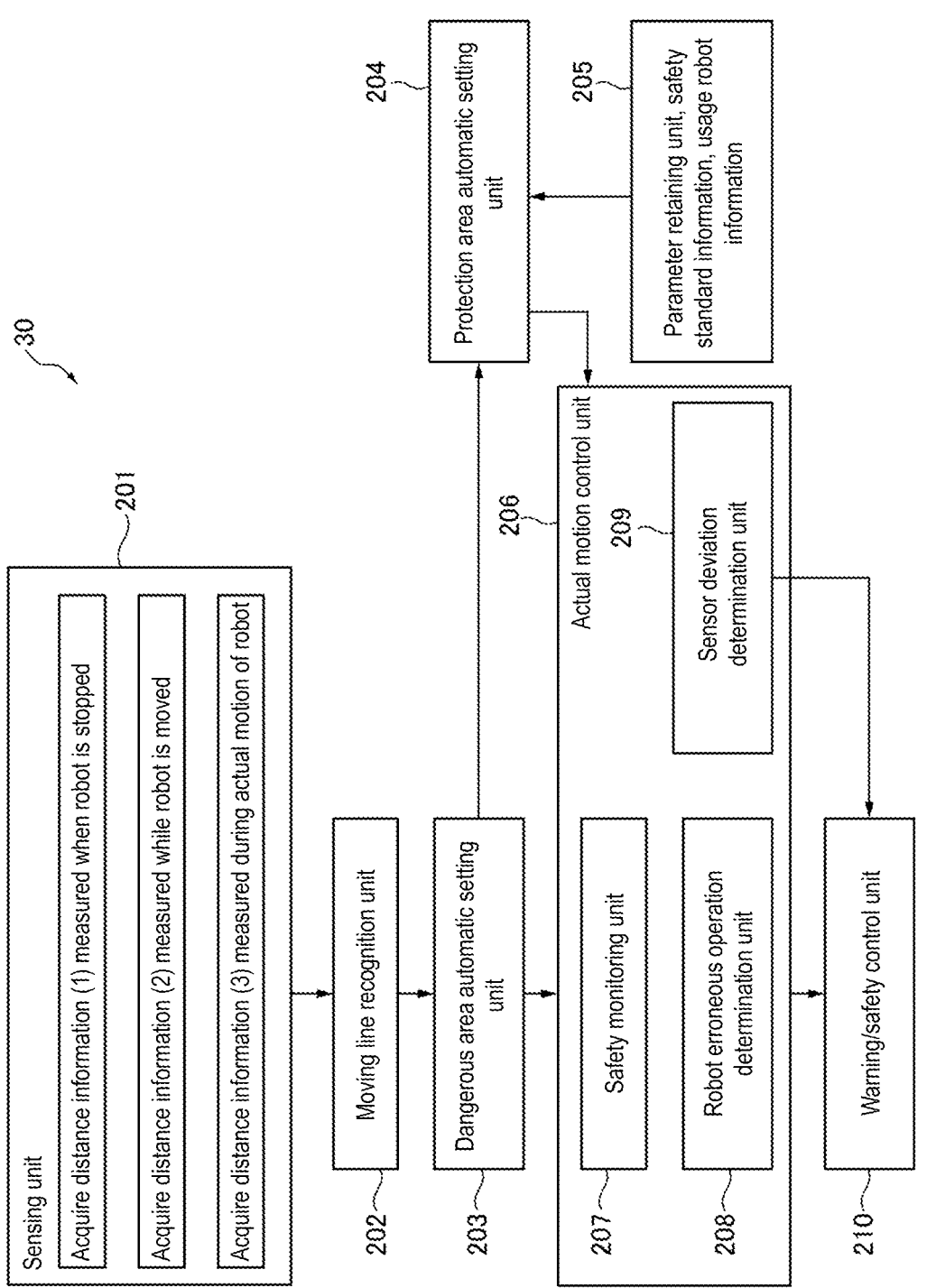
FIG. 2 is a functional block diagram illustrating a controller.
Figure 3:
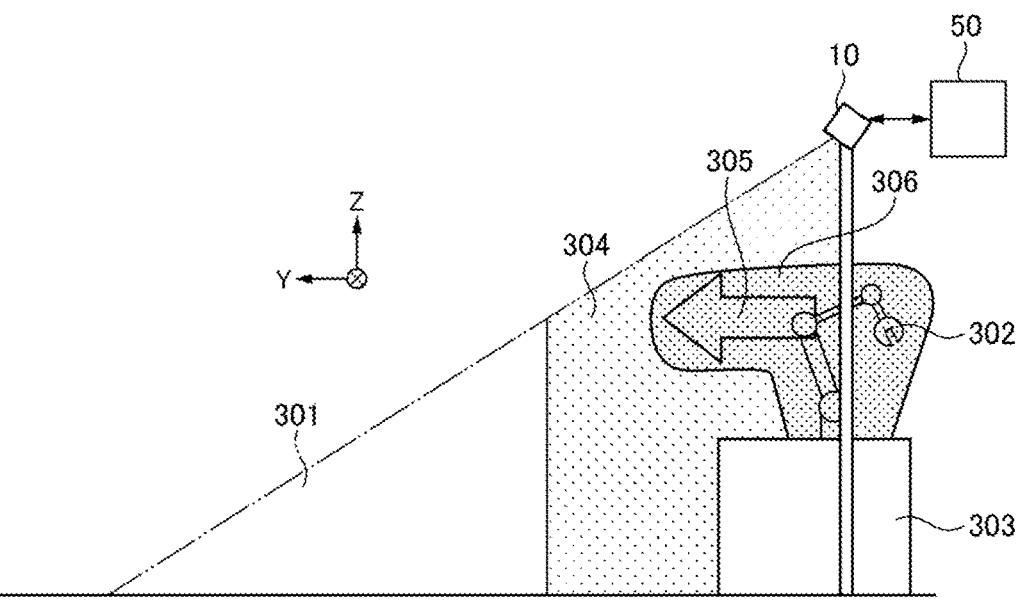
FIG. 3 is a schematic side view illustrating a site where the monitoring system is used.

An application example of an information processing apparatus according to the present invention will be described with reference to FIGS. 1 to 3. FIG. 1 is a block diagram illustrating a monitoring system including an information processing apparatus 50 according to an embodiment of the present invention. FIG. 2 is a functional block diagram illustrating a controller. FIG. 3 is a schematic side view illustrating a site where the monitoring system is used. The directions of each unit will be referred to with reference to the X, Y, and Z coordinate axes illustrated in FIG. 3. When viewed from the sensor 10, the forward side is the +Y direction, the upward side is the +Z direction, and the right side is the +X direction.

As illustrated in FIG. 3, as a site where a 3-dimensional distance sensor 10 (hereinafter referred to as a sensor 10) that measures and outputs 3-dimensional distance information is used, a place where it is necessary to monitor an object, such as a production site where a robot or a machine (hereinafter simply referred to as a "robot 302") as a source of danger performs production in cooperation with an operator, is assumed. The robot 302 is installed on a work table 303 and passes through a moving line 305 which is a 3-dimensional operation range during an actual motion. That is why the hand may collide with the robot 302, when the operator puts her or his hand on the moving line 305, for example. Therefore, as a dangerous area 306 which is a dangerous area where the hand may actually collide with the robot 302 or is highly likely to collide with the robot 302 when the operator puts out her or his hand, a 3-dimensional area which includes the moving line 305 of the robot 302 and is set to be a size larger than the moving line 305 of the robot 302 is determined. An object (intruder) such as a human body approaching the dangerous area 306 is monitored using the sensor 10 during an actual motion of the robot 302.

On the other hand, when a positional deviation or an optical axis deviation (hereinafter simply referred to as a "deviation of the sensor 10") from start of installation occurs in the sensor 10 during an actual motion of the robot, it is necessary to warn the user of the occurrence. This is because the occurrence of the deviation of the sensor 10 affects a measurement result of the sensor 10 and may cause an error, but it is not easy for the user to recognize the deviation of the sensor.

Accordingly, in the embodiment, as illustrated in FIG. 3, the user installs the sensor 10 so that at least a part of the robot 302 enters the measurable area 301. In this state, the sensing unit 201 (FIG. 2) of the controller 30 serving as an acquirer acquires distance information measured and output by the sensor 10. Then, a moving line recognizer 202 (FIG. 2) of the controller 30 serving as a recognizer recognizes the moving line 305 of the robot 302 from the distance information measured by the sensor 10 while moving the robot 302. At this time, in order to measure the outer shape of the robot 302 at various positions and postures on the moving line, distance information is measured at a plurality of timings. A dangerous area automatic setter 203 (FIG. 2) of the controller 30 serving as a decider decides a dangerous area 306 based on the moving line 305. Based on the distance information measured by the sensor 10 during an actual motion of the robot 302, an actual motion controller 206 (FIG. 2) of the controller 30 serving as the determiner determines whether there is a change in the moving line 305 of the robot 302, that is, whether a deviation of the sensor 10 occurs. When the actual motion controller 206 determines that a deviation of the sensor 10 has occurred, a warning/safety controller 210 (FIG. 2) of the controller 30 serving as a warner gives a warning indicating that a deviation has occurred.

The protection area automatic setter 204 (FIG. 2) of the controller 30 serving as a protection area setter sets, outside of the dangerous area 306, a protection area 304 (FIG. 3) which is a 3-dimensional area where a safety distance is taken into consideration. The actual motion controller 206 (FIG. 2) serving as monitor monitors an intruder into the protection area 304, that is, an intruder approaching the dangerous area 306, based on distance information measured by the sensor 10 during the actual motion of the robot 302. For example, when an object such as a human body enters the protection area 304, the warning/safety controller 210 performs safety control such as low-speed driving or stopping the robot 302. When an intruder into the protection area 304 is detected, the actual motion controller 206 may further determine whether the intruder has entered the protection area 304 from the opposite side with respect to the dangerous area 306 or has entered the protection area 304 from the dangerous area 306. The former case may be regarded as intrusion of a human body or the like. In the latter case, however, since there is a low likelihood of intrusion of a human body or the like, there is a high possibility of deviation of the sensor 10 or an erroneous operation of the robot 302. The warning/safety controller 210 (FIG. 2) gives a danger warning when the actual motion controller 206 determines that a deviation of the sensor 10 or an erroneous operation of the robot 302 has occurred.

As illustrated in FIG. 1, the sensor 10 includes a light emitter 41, a light receiver 42, and a calculator 43. The light emitter 41 emits light (for example, infrared light), and the light receiver 42 receives reflected light. As an example, a time-of-flight (TOF) sensor that acquires a distance image from TOF of light is adopted as the sensor 10. For example, an indirect TOF sensor that estimates a time difference from a phase difference between projected light and reflected light is employed. The sensor 10 outputs 3-dimensional distance information and luminance information as a measurement result. The measurement result by the sensor 10 includes distance information of each position in the measurable area 301. The measurement result is supplied to the controller 30 via the sensor I/F 44 in the information processing apparatus 50. The controller 30 controls the sensor 10 via the sensor I/F 44.

The foregoing application example is an example for helping to understand the present invention and is not intended to limit the interpretation of the present invention.

Embodiment

Next, a configuration of the information processing apparatus 50, functions of the controller 30, and the like according to the embodiment of the present invention will be described in detail.

First, the configuration of the information processing apparatus 50 will be described with reference to FIG. 1. The information processing apparatus 50 includes a controller 30, a sensor I/F 44, a display 34, an operation inputter 35, a storage 36, and a communication I/F 37. The controller 30 includes a CPU 31, a ROM 32, a RAM 33, a timer (not illustrated), and the like. The ROM 32 stores a control program which is executed by the CPU 31. The ROM 32 also stores values such as various thresholds. The RAM 33 provides a work area when the CPU 31 executes a control program.

The display 34 is configured with, for example, a liquid crystal display or the like and displays various types of information. The display 34 may have two or more screens or may have a function of displaying two or more screens by screen division. The operation inputter 35 receives inputs of various instructions from the user and transmits the input information to the CPU 31. The operation inputter 35 may have a function of giving a warning to the user by a vocal sound, a lamp, or the like based on an instruction from the CPU 31. The storage 36 is configured with, for example, a nonvolatile memory. The storage 36 may be an external memory. The communication I/F 37 performs wired or wireless communication between the controller 30 and the robot 302.

Next, each function of the controller 30 will be described with reference to FIG. 2. The controller 30 includes the sensing unit 201, the moving line recognizer 202, the dangerous area automatic setter 203, the protection area automatic setter 204, a parameter retainer 205, the actual motion controller 206, and the warning/safety controller 210. The actual motion controller 206 includes a safety monitor 207, a robot erroneous operation determiner 208, and a sensor deviation determiner 209. Each of these functions is implemented in a software way by a program stored in the ROM 32. That is, the CPU 31 loads and executes a necessary program in the RAM 33 to perform various calculations and control each hardware resource, so that each function is provided. In other words, the function of the sensing unit 201 is mainly implemented in cooperation with the CPU 31, the ROM 32, the RAM 33, and the sensor I/F 44. The functions of the moving line recognizer 202 and the dangerous area automatic setter 203 are mainly implemented in cooperation with the CPU 31, the ROM 32, the RAM 33, the display 34, and the operation inputter 35. The functions of the protection area automatic setter 204 and the actual motion controller 206 are mainly implemented in cooperation with the CPU 31, the ROM 32, and the RAM 33. The function of the parameter retainer 205 is mainly implemented by the ROM 32. The function of the warning/safety controller 210 is mainly implemented in cooperation with the CPU 31, the ROM 32, the RAM 33, the operation inputter 35, and the communication I/F 37.

As illustrated in FIG. 3, the sensing unit 201 acquires distance information from the sensor 10 installed so that at least a part of the robot 302 enters the measurable area 301 via the sensor I/F 44. Before an actual motion of the robot 302 is performed, the sensing unit 201 acquires distance information (1) measured by the sensor 10 when the robot 302 is stopped, and acquires distance information (2) measured by the sensor 10 at different timings while the robot 302 is moved. The sensing unit 201 periodically acquires distance information (3) measured by the sensor 10 during an actual motion of the robot 302. The acquired distance information (1) to distance information (3) are primarily stored in the RAM 33.

The distance information (1) is used to set surrounding environment information indicating a range occupied by an object other than the robot 302 in the measurable area 301 such as a floor, a wall, and a safety fence in addition to the work table 303 illustrated in FIG. 3. A specific method of setting the surrounding environment information will be described below.

The distance information (2) is used to recognize the moving line 305 of the robot 302, and the dangerous area 306 is determined based on the moving line 305. Accordingly, in order to set the dangerous area 306 to a minimum and optimum dangerous area, it is preferable to acquire the distance information (2) while the robot 302 is moved through the same operation as in the actual motion.

The distance information (3) is used to monitor an intruder approaching the dangerous area 306, determine whether there is a deviation of the sensor 10, and determine whether there is an erroneous operation of the robot 302 during the actual motion of the robot 302.

The moving line recognizer 202 reads the distance information (1) from RAM 33, converts the distance information (1) into point cloud information on the orthogonal XYZ coordinate system of the global coordinate system, and draws the point cloud information on display 34. For example, an object in the measurable area 301 such as the robot 302 or the work table 303 is drawn as a cluster of point clouds. When the user selects an object (cluster) drawn on the display 34 using the operation inputter 35, a position and a size of the selected object are registered in the surrounding environment information. The registered surrounding environment information is stored in the storage 36.

The moving line recognizer 202 reads each piece of distance information (2) acquired by the sensing unit 201 from the RAM 33, converts each piece of distance information (2) into point cloud information (object range information) on the orthogonal XYZ coordinate system of the global coordinate system, and excludes the surrounding environment information (a range of the work table 303 or the like) stored in the storage 36 from the converted point cloud information. Accordingly, point cloud information (actual operation information) indicating the robot 302 at each timing at which the distance information (2) is measured is generated.

Thereafter, the moving line recognizer 202 sequentially plots the point cloud information of the robot 302 at each timing at which the distance information (2) is measured, and recognizes all the plotted point cloud information as the moving line 305 of the robot 302.

Although not illustrated in FIG. 3, distance information from another sensor (for example, a sensor 10' having a configuration common to the sensor 10) may also be acquired, and actual motion information of the robot 302 extracted in accordance with a method similar to the foregoing method may be further superimposed. By combining the distance information of the plurality of sensors in this way, it is possible to reduce a blind spot caused by the robot 302 and to obtain the dangerous area 306 with higher accuracy. For the blind spot of the sensor 10, the moving line 305 of the robot 302 is calculated using only distance information from the sensor 10'.

Figure 4:
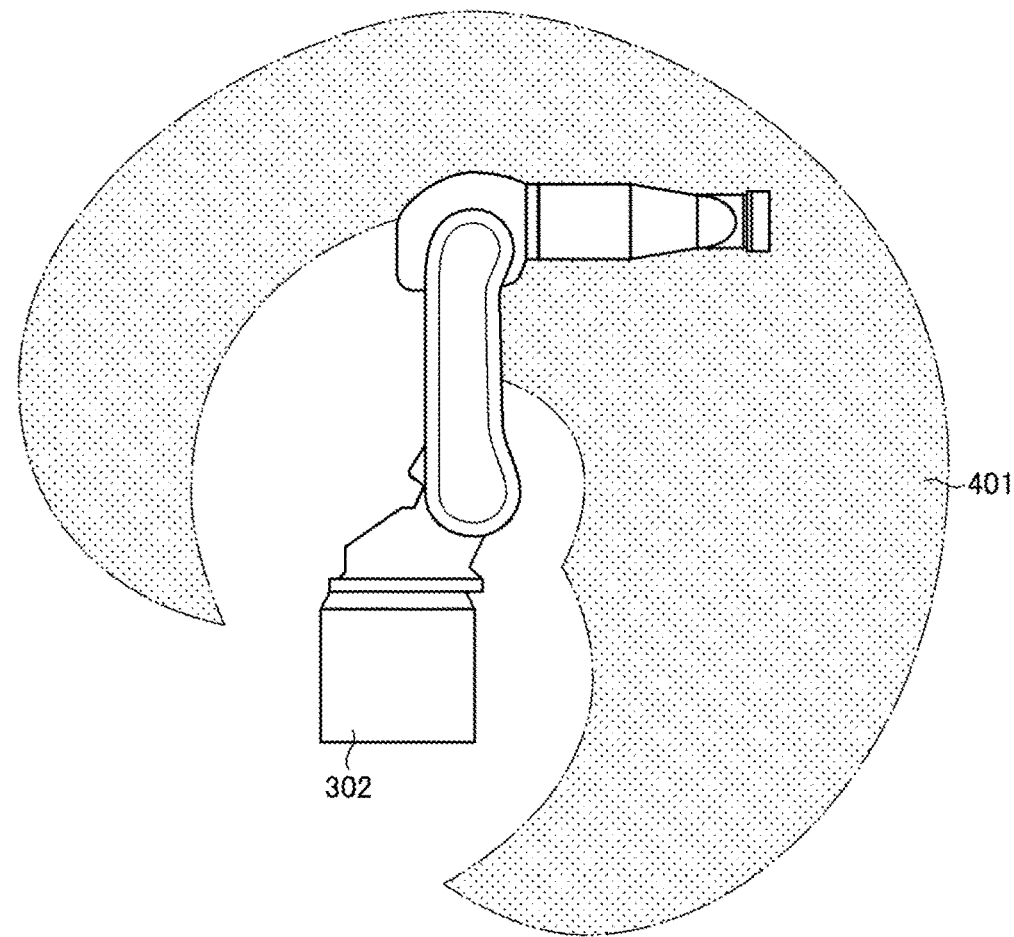
FIG. 4 is a diagram illustrating an operation range of a robot.

The dangerous area automatic setter 203 temporarily sets, as dangerous area 306, 3-dimensional shape 401 (FIG. 4) surrounding all the moving lines 305 of the robot 302 recognized by the moving line recognizer 202, and 3-dimensionally displays the 3-dimensional shape 401 on display 34. At this time, an outermost peripheral portion of the dangerous area 306 is surrounded by a wire frame. When the user adjusts the size of the wire frame using the operation inputter 35, the position and the size of the adjusted wire frame are registered as a range of the dangerous area 306 in the storage 36.

In the embodiment, the case where the user adjusts the size of the wire frame drawn on the display 34 has been exemplified, but the present invention is not limited thereto as long as the user can change the shape of the dangerous area 306. For example, the outermost peripheral portion of the dangerous area 306 may be surrounded by a box-shaped frame, a spherical frame, or a polygonal frame instead of a wire frame, or an actual plot of the moving line 305 may be displayed.

When the dangerous area 306 is determined from moving line 305, the dangerous area automatic setter 203 may determine the size of the dangerous area 306 in consideration of a margin read from ROM 32. Further, the user is allowed to be able to change the value of the margin, and the set dangerous area 306 and the value of the margin may be displayed in a superimposed manner on the display 34. In this case, the size of dangerous area 306 is changed according to the margin changed by the user.

The protection area automatic setter 204 sets, outside of the dangerous area 306 registered in storage 36, the protection area 304 which is a 3-dimensional area where the safety distance is taken into consideration.

Here, the safe distance is a distance at which it can be guaranteed that the robot 302 completes deceleration and stopping before an intruder into the protection area 304 reaches the dangerous area 306. The safe distance is determined in accordance with a safety standard in consideration of a response speed of the sensor 10, an operation speed and braking performance of the robot 302, and the like.

Accordingly, the protection area automatic setter 204 reads usage robot information (information such as an operation speed and braking performance of the robot 302) in the parameter retainer 205, reads the safety standard information to be used, and calculates the safety distance based on the usage robot information and the safety standard information.

The protection area automatic setter 204 may further set the protection area 304 in consideration of the surrounding environment information stored in the storage 36. For example, when it can be determined from the surrounding environment information (a position and a size of a desk) that the operator cannot access the dangerous area 306 from the right side because of presence of the desk, the protection area automatic setter 204 does not set the protection area 304 on the right side of the dangerous area 306. Accordingly, the minimally necessary protection area 304 can be set.

When there is an area located outside of the measurable area 301 in the set protection area 304, the operation inputter 35 may give a warning to the user. This is because the sensor 10 cannot measure distance information in an area located outside of the measurable area 301 and cannot use the area as the protection area 304.

By using the distance information (3) acquired by the sensing unit 201, the dangerous area 306 set by the dangerous area automatic setter 203, and the protection area 304 set by the protection area automatic setter 204, the actual motion controller 206 performs safety monitoring during an actual motion of the robot 302, determines whether there is an erroneous operation of the robot, and determines whether there is a deviation of the sensor 10.

The safety monitor 207 in the actual motion controller 206 monitors an intruder approaching the dangerous area 306 based on the distance information (3) for the safety monitoring during the actual motion of the robot 302. Specifically, the safety monitor 207 monitors the intruder approaching the dangerous area 306 by detecting an object moving from the protection area 304 to the dangerous area 306 based on the distance information (3).

In order to determine whether an erroneous operation of the robot has occurred, the robot erroneous operation determiner 208 in the actual motion controller 206 detects an object in the dangerous area 306 and the protection area 304 based on the distance information (3), and determines whether there is an object moving from the dangerous area 306 to the protection area 304. In a general situation, it is difficult to consider that an object moves from the dangerous area 306 to the protection area 304. When such an object is detected, a likelihood of a deviation or a failure of the sensor 10 or an erroneous operation (for example, an erroneous operation such as protrusion of an arm of the robot 302 from the dangerous area 306) of the robot 302 occurring is assumed.

The sensor deviation determiner 209 in the actual motion controller 206 determines whether the moving line 305 of the robot 302 has changed based on the distance information (3) in order to determine whether there is a deviation of the sensor 10. When there is a change in the moving line 305 of the robot 302, the sensor deviation determiner 209 determines that a deviation such as an installation position deviation or an optical axis deviation of the sensor 10 (a deviation of the sensor 10) occurs.

When an intruder approaching the dangerous area 306 is detected as a result of the monitoring by the safety monitor 207, the warning/safety controller 210 gives a stopping command or a deceleration command to the robot 302 via the communication I/F 37. Accordingly, for example, the robot 302 can be stopped or set to a safe speed before the operator reaches the dangerous area 306. At this time, the operation inputter 35 may give a warning to the user.

When the robot erroneous operation determiner 208 determines that an erroneous operation of the robot 302 has occurred, the warning/safety controller 210 (a danger warner) gives a danger warning to the user by the operation inputter 35 and gives a stopping command or a deceleration command to the robot 302 to cause the robot 302 to proceed to the safe operation state. This is because there is a risk that the body of the operator collides with the robot 302 even when the operator does not approach the dangerous area 306 when the erroneous operation occurs during the actual motion of the robot 302.

Further, when the sensor deviation determiner 209 determines that a deviation of the sensor 10 occurs, the warning/safety controller 210 warns the user that the deviation occurs at the setting position or the optical axis position of the sensor 10 through the operation inputter 35. Accordingly, the user can easily recognize the deviation of the setting position or the optical axis position of the sensor 10.

Figure 5:
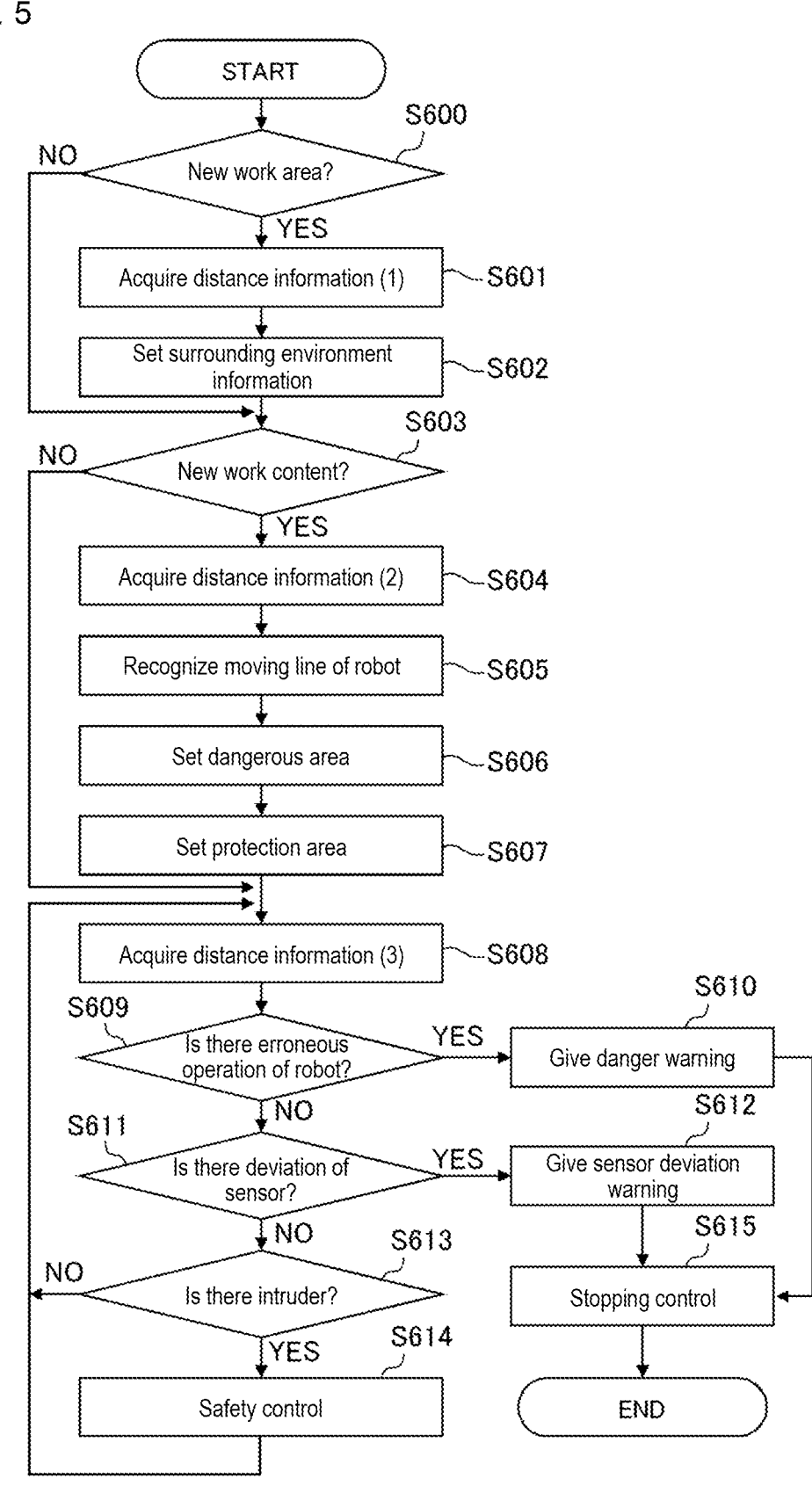
FIG. 5 is a flowchart illustrating sensor deviation detection processing.

Next, FIG. 5 is a flowchart illustrating monitoring processing and sensor deviation detection processing.

This processing is implemented by the CPU 31 loading a program stored in the ROM 32 to the RAM 33 and executing the program. This processing is started in response an instruction from the user after the user installs the sensor 10 so that at least a part of the robot 302 enters the measurable area 301 and before the robot 302 performs the actual motion.

First, in step S600, it is determined whether the work area where the robot 302 is installed is a new work area. For example, when the robot 302 is configured to be movable and is moved to a different line, a different work processing, or the like to be used, it is necessary to update the surrounding environment information in accordance with the work area of a movement destination. Accordingly, when the work area is new (unknown), the processing proceeds to step S601. Conversely, when the work area is not new (registered), steps S601 to S602 are omitted. The determination of step S600 is performed, for example, by displaying a screen for inquiring the user whether the work area is new or registered on the display 34.

In step S601, the user inputs an instruction to acquire the distance information (1) using the operation inputter 35 in a state where the robot 302 is stopped. When there is an instruction to acquire the distance information (1), the sensing unit 201 acquires the distance information (1) measured by the sensor 10.

In step S602, the moving line recognizer 202 sets surrounding environment information based on the acquired distance information (1). This processing corresponds to registration (learning) of the work area.

In step S603, it is determined whether the work content performed by the robot 302 is new. For example, when the work content to be executed by the robot 302 is changed, the moving line of the robot 302 may be changed. Accordingly, it is necessary to reset the dangerous area and the protection area. When the work content is new, the processing proceeds to step S604. When the work content is not new, the surrounding environment information, the dangerous area 306, and the protection area 304 are set based on the information retained in the storage 36. Thereafter, the processing proceeds to step S608. The determination in step S603 is performed, for example, by displaying a screen for inquiring the user whether the work content performed by the robot 302 is a new work content or existing work content on the display 34.

In step S604, the user causes the robot 302 to start the same motion as during the actual motion, and then inputs an instruction to acquire the distance information (2) using the operation inputter 35. When there is an instruction to acquire the distance information (2), the sensing unit 201 acquires the distance information (2) measured by the sensor 10.

In step S605, the moving line recognizer 202 recognizes the moving line 305 of the robot based on the surrounding environment information and the distance information (2).

In step S606, dangerous area automatic setter 203 determines dangerous area 306 based on moving line 305 of the robot.

In step S607, the protection area automatic setter 204 sets the protection area 304 based on the dangerous area 306, the safe distance, and the like.

When the foregoing setting is completed, work (an actual motion) by the robot 302 can be started. After the actual motion is started, the distance information (3) periodically measured by the sensor 10 is taken by the sensing unit 201 in step S608.

In step S609, the robot erroneous operation determiner 208 determines whether there is an erroneous operation of the robot 302 based on the acquired distance information (3). When it is determined that there is a possibility of the erroneous operation of the robot 302, an erroneous operation detection notification is transmitted to the warning/safety controller 210. Thereafter, the processing proceeds to step S610. If there is no erroneous operation of the robot 302, the processing proceeds to step S611.

When the erroneous operation detection notification is taken, the warning/safety controller 210 gives a danger warning to the user (step S610), transmits a stopping command (or a deceleration command) to the robot 302 via the communication I/F 37 (step S615), and ends the processing. This is because it is dangerous to continue the actual motion in a state where there is a possibility of the erroneous operation. The user may inspect and check the operation of the robot 302 and the like, take necessary measures. Thereafter, the surrounding environment information, the dangerous area, and the protection area may be reset from step S600.

In step S611, the sensor deviation determiner 209 determines whether there is a deviation of the sensor 10 based on the acquired distance information (3). When it is determined that there is a possibility that the deviation of the sensor 10 occurs, the sensor deviation detection notification is transmitted to the warning/safety controller 210. Thereafter, the processing proceeds to step S612. When there is no deviation of the sensor 10, the processing proceeds to step S613.

When the sensor deviation detection notification is given, the warning/safety controller 210 warns the user that the deviation of the sensor 10 occurs (step S612), transmits a stopping command (or a deceleration command) to the robot 302 via the communication I/F 37 (step S615), and ends the processing. This is because it is dangerous to continue the actual motion in a state where there is a possibility that the sensor 10 deviates. The user may inspect and check the operation of the sensor 10, take necessary measures, and then reset the surrounding environment information, the dangerous area, and the protection area from step S600.

In step S613, the safety monitor 207 determines whether there is an intruder approaching the dangerous area 306 based on the acquired distance information (3). As a result of the determination, when there is the intruder, an intruder detection notification is transmitted to the warning/safety controller 210. Thereafter, the processing proceeds to step S614. When there is no intruder, the processing returns to step S608.

In step S614, the warning/safety controller 210 receives the intruder detection notification from the safety monitor 207, transmits a stopping command, a deceleration command, or the like to the robot 302 via the communication I/F 37, performs safety control, and then returns to step S608. According to the embodiment, before the actual motion of the robot 302 is started, the controller 30 recognizes the moving line 305 of the robot 302 from the distance information (2) measured by the sensor 10 while moving the robot 302, and determines the dangerous area 306 based on the moving line 305. After the actual motion of the robot 302 starts, the controller 30 monitors an intruder approaching the dangerous area 306 based on the distance information (3) periodically measured by the sensor 10, and simultaneously gives a warning indicating that a deviation of the sensor 10 occurs when the deviation of the sensor 10 occurs. Accordingly, the user can easily recognize the deviation of the sensor 10.

When the 3-dimensional distance sensor used as the sensor 10 is a sensor measures and outputs 3-dimensional distance information, a different type of sensor may be adopted. When the TOF sensor is adopted, either a direct type or an indirect type sensor may be adopted. In addition, a sensor using radio waves or the like other than light is also applicable.

The information processing apparatus 50 can be configured with, for example, a computer including a processor, a memory, a storage, and the like. In this case, the configuration illustrated in FIG. 2 is implemented by loading a program stored in the storage into the memory and causing the processor to execute the program. Such a computer may be a general-purpose computer such as a personal computer, a server computer, a tablet terminal, or a smartphone or may be an embedded computer such as an on-board computer. Alternatively, all or a part of the configuration illustrated in FIG. 2 may be configured by an ASIC, an FPGA, or the like. Alternatively, all or a part of the configuration illustrated in FIG. 2 may be implemented by cloud computing or distributed computing.

<Supplementary Note>

[1] An information processing apparatus (50) including:

an acquirer (201) configured to acquire distance information measured and output in a state where a sensor (10) is installed so that at least a part of a robot (302) enters a measurable area of the sensor (301);

a recognizer (202) configured to recognize a 3-dimensional operation range of the robot from the distance information measured by the sensor at a plurality of timings while moving the robot;

a determiner (206) configured to determine whether there is a change in the 3-dimensional operation range (305) of the robot based on the distance information measured by the sensor during an actual motion of the robot; and a warner (210) configured to give a warning indicating occurrence of a deviation of the sensor when it is determined that there is a change in the 3-dimensional operation range of the robot.

[2] An information processing method comprising:

a step (S601, S603, S607) of acquiring distance information measured and output in a state where a sensor (10) is installed so that at least a part of a robot (302) enters a measurable area of the sensor;

a step (S604) of recognizing a 3-dimensional operation range of the robot from the distance information measured by the sensor at a plurality of timings while moving the robot;

a step (S608, S614) of determining whether there is a change in the 3-dimensional operation range of the robot based on the distance information measured by the sensor during an actual motion of the robot; and a step (S615) of giving a warning indicating occurrence of a deviation of the sensor when the determiner determines that there is a change in the 3-dimensional operation range of the robot.

DESCRIPTION OF SYMBOLS 10 sensor
30 controller
50 information processing apparatus
201 sensing unit
202 moving line recognizer
203 dangerous area automatic setter
206 actual motion controller
210 warning/safety controller
301 measurable area
302 robot
303 work table
304 protection area
305 moving line
306 dangerous area

The invention claimed is:

1. An information processing apparatus comprising:

an acquirer configured to acquire distance information measured and output in a state where a sensor is installed so that at least a part of a robot enters a measurable area of the sensor;

a recognizer configured to recognize a 3-dimensional operation range of the robot from the distance information measured by the sensor at a plurality of timings while moving the robot;

a determiner configured to determine whether there is a change in the 3-dimensional operation range of the robot based on the distance information measured by the sensor during an actual motion of the robot;

a warner configured to give a warning indicating occurrence of a deviation of the sensor when the determiner determines that there is a change in the 3-dimensional operation range of the robot;

a determiner configured to determine a dangerous area based on the 3-dimensional operation range of the robot;

a monitor configured to monitor an intruder approaching the dangerous area based on the distance information measured by the sensor during the actual motion of the robot; and a protection area setter configured to set, outside of the dangerous area, a protection area which is a 3-dimensional area where a safety distance is taken into consideration, wherein the monitor monitors the intruder approaching the dangerous area in the protection area, wherein the monitor further detects an object moving from the dangerous area to the protection area based on the distance information measured by the sensor during the actual motion of the robot, and wherein the information processing apparatus further comprises a danger warner configured to give a danger warning when the monitor detects the object moving from the dangerous area to the protection area.

2. The information processing apparatus according to claim 1, wherein the distance information measured by the sensor at the plurality of timings is distance information measured by the sensor while moving the robot in the same operation as during the actual motion.

3. The information processing apparatus according to claim 1, wherein, whenever work content by the robot is changed, the recognizer recognizes an operation range of the robot in accordance with the changed work content.

4. The information processing apparatus according to claim 1, wherein the determiner determines a size of the dangerous area in consideration of a 3-dimensional operation range and a margin of the robot, the margin being user-changeable.

5. The information processing apparatus according to claim 1, wherein the protection area setter sets the protection area in consideration of the surrounding environment information indicating the range occupied by the object other than the robot in the measurable area.

6. The information processing apparatus according to claim 1, wherein, when there is an area located outside of the measurable area in the protection area, a warning is given.

7. The information processing apparatus according to claim 1, wherein the recognizer converts each piece of distance information measured by the sensor at the plurality of timings into object range information indicating a range occupied by each object in the measurable area, generates actual motion information indicating a range occupied by the robot in the measurable area, excluding surrounding environment information indicating a range occupied by an object other than the robot in the measurable area from the object range information indicating the range occupied by each object in the measurable area, and calculates the 3-dimensional operation range of the robot by superimposing the actual motion information at the plurality of timings.

8. The information processing apparatus according to claim 7, further comprising a setter configured to set the surrounding environment information based on the distance information measured by the sensor in a state where the robot is stopped.

9. An information processing method comprising:

a step of acquiring distance information measured and output in a state where a sensor is installed so that at least a part of a robot enters a measurable area of the sensor;

a step of recognizing a 3-dimensional operation range of the robot from the distance information measured by the sensor at a plurality of timings while moving the robot;

a step of determining whether there is a change in the 3-dimensional operation range of the robot based on the distance information measured by the sensor during an actual motion of the robot;

a step of giving a warning indicating occurrence of a deviation of the sensor when it is determined that there is a change in the 3-dimensional operation range of the robot;

a step of determining a dangerous area based on the 3-dimensional operation range of the robot;

a step of monitoring an intruder approaching the dangerous area based on the distance information measured by the sensor during the actual motion of the robot;

a step of setting, outside of the dangerous area, a protection area which is a 3-dimensional area where a safety distance is taken into consideration, wherein the step of monitoring includes monitoring the intruder approaching the dangerous area in the protection area;

a step of detecting an object moving from the dangerous area to the protection area based on the distance information measured by the sensor during the actual motion of the robot; and a step of giving a danger warning when the object moving from the dangerous area to the protection area is detected.

10. A non-transitory computer readable medium storing a program causing a computer to execute each step of the information processing method according to claim 9.

* * * * *